3,218,286
HALO-METHYL PHENOL RESIN RUBBER CURING COMPOSITION AND METHOD FOR PREPARING SAME

James V. Fusco, Westfield, and Samuel B. Robison, Roselle, N.J., assignors to Esso Research and Engineering Company, a corporation of Delaware
No Drawing. Filed June 2, 1960, Ser. No. 33,370
10 Claims. (Cl. 260—33.6)

The present invention relates to an improved means of making halogenated polymethylol phenol resins suitable for use in curing rubbery compositions. More particularly, it deals with an improved method of recovering halogenated polymethylol phenol resins from the halogenation solvent stripping zone.

It has only very recently been appreciated that the halogenated products of certain polymethylol hydrocarbon-substituted, phenol resins are exceptionally effective curing agents for butyl rubber. The term "butyl rubber" is herein intended to denote copolymers of about 85 to 99.5 weight percent of a $C_4$ to $C_7$ isoolefin such as isobutylene, 3-methyl butene-1, with about 15 to 0.5 weight percent of a multiolefin of about 4 to 14 carbon atoms, e.g., myrcene, isoprene, butadiene. Such rubbers are well known in the art, e.g., see U.S. Patent 2,356,128 and chapter 24 of "Synthetic Rubber," by G. S. Whitby (John Wiley & Sons, 1954), and are characterized by their low unsaturation, i.e., Wijs iodine numbers of 0.5 to 50.

Generally, the halogenation of such resins is carried out in a light organic solution, e.g., benzene, hexane, chloroform, etc., by bubbling halide-containing gas into the solution, or by the addition of aqueous hydrogen halide solutions to a resin-light organic solution, or a resin-water solution. The light organic solvent boils below 220° F. and generally is toluene. Heretofore, after the halogenation was complete, the light organic and/or water solvent was stripped from the resin to yield a solid halogen modified resin.

This stripping operation presented substantial difficulties. It was a delicate and critical operation since excess heat readily caused the halogenated resin to undergo further reaction and resulted in deactivation of the resin, with respect to its curing ability, due to either continued resin polymerization or by degradation. Although stripping under reduced pressure conditions so as to lower stripping temperature was employed, degradation of the resin was still encountered, particularly towards the end of the stripping operation when stripping temperatures are highest in order to remove the last traces of light organic or water solvent. In addition, difficulty was encountered in recovering the dry resin from the stripping operations and processing it into rubber compositions.

In accordance with the present invention, the above-described problems are overcome and a composition readily suitable for application in curing rubbers is obtained. Specifically, according to the present invention, the halogenated polymethylol, hydrocarbon substituted phenol resin is mixed at some point in the processing step prior to the latter stage of the stripping step with a relatively heavy hydrocarbon fraction normally classed as a rubber plasticizer. The oil has a flash point of at least 350° F., and an unsaturation level conforming to a Wijs iodine number of at most 35. Thus the oil serves as resin carrier vehicle during stripping in order to aid the removal of light organic or water solvent, and to maintain the resin in a fluid solution thus facilitating resin transfer and processing with the rubbery compounds. The dilution effect due to the presence of the oil during stripping minimizes resin self polymerization tendencies. The resin-oil blend is easily discharged from the stripping zone. It is readily packaged, and handled (as opposed to the difficulty in handling the low melting point solid resin), and requires no heating for dispersion into the rubber.

The heavy hydrocarbon oil may be introduced at various stages of the halogenated resin formation process. It may be added to a solution of the methylol phenol resin prior to halogenation of the resin, or after the halogenation but before the completion of the stripping operation.

The blend of halogenated resin and carrier oil obtained from the stripping zone may be directly utilized as a curing component of a rubber vulcanization recipe. Vulcanizates formed by utilizing the fluid oil-resin solution as a curing component show good tensile properties, appearance, and resistance to scorching. Generally sufficient carrier oil will have been added in the processing of the halogenated polymethylol phenol to give a blend containing 25 to 75 weight percent solids in the oil-resin mixture used for curing. Normally about 10 to 50, preferably 15 to 40, parts by weight of blend will be used in curing each 100 weight parts of rubber. In addition to the resin-oil blend and the rubbery polymer, or combination of polymers to be cured, the vulcanization recipes may contain conventional compounding materials such as pigments, carbon blacks, mold release compounds such as stearic acid, vulcanization accelerators such as thiocarbamic acid derivatives, polyvalent metal compounds, particularly Group II and IV metal compounds such as magnesium oxide, zinc stearate, zinc oxide, calcium stearate, etc. and numerous other conventional components well known to those skilled in the art.

It is to be clearly understood that the present invention is distinguished from merely incorporating extender oils in butyl rubber vulcanization recipes. Such a procedure would not give the benefit of improved stripping of halogenated resin, and ease of recovering the resin and processing it with rubbery stocks. For the same reasons, the present invention is distinguished from varnishes formed by phenolic resins.

The oil extended, halomethyl hydrocarbon-substituted phenol curing agents used in the present invention may be obtained by halogenating polymethylol phenols, such as 2,6-dimethylol para-substituted phenols, either in the monomeric or polymeric form, so as to at least partially substitute halogen for the hydroxyl portion of the methylol groups. The halogenation may be carried out at temperatures ranging between about 0 and 150° C., but preferably from 20 to 80° C. using an appropriate halogenating agent. Among the halogenating agents which have been found suitable are alkali metal hypochlorites or hypobromites, $C_4$ to $C_{10}$ tertiary alkyl hypochlorites or hypobromites, sulfur bromides, sulfuryl chloride, N-bromosuccinimide, N,N'-dichloro-5,5 dimethyl-hydantoin, iodine halides, etc. The preferred halogenating agents are gaseous hydrogen fluoride, hydrogen chloride, hydrogen bromide, hydrogen iodide, chlorine and substances which form hydrogen halide under reaction conditions, such as liquid bromine.

Generally the polymethylol compound or resin which is to be halogenated is dissolved in a substantially inert organic solvent boiling below 220° F., such as hexane, benzene, toluene, chloroform, or carbon tetrachloride, to form a 10 to 70 weight percent solution which is then contacted with a halogenating agent for a period ranging from a few minutes up to several days, depending upon the reactivity of the specific halogenating agent. Alternatively, the resin may be contacted with halogenating agent under aqueous conditions. As noted previously, the heavy oil resin carrier may be present during the halogenation, or added subsequently. Thus, the solvent medium employed for carrying out the halogenation reaction may be selected from the group consisting of inert organic solvents and water.

The amount of halogenating agent employed will vary according to the amount and type of halogen which is to be incorporated in the polymethylol substance as well as whether or not the polymethylol substance is monomeric or polymeric. The halogenated polymethylol hydrocarbon-substituted phenol can contain from 2 to 20 weight percent of combined halogen but, for most purposes, it is not necessary to put more than about 5 weight percent of combined halogen into the polymethylol compound to obtain a product having the wanted properties.

After the halogenation is completed the resin solution is sent to a stripping zone where it is subjected to stripping in the presence of the carrier oil. Generally, temperatures of 60 to 100° C. at 30 to 100 mm. Hg pressure are employed so as to remove the light organic solvent or water and form a residual resin-heavy oil blend which is simply recovered by pouring the remaining resin-oil solution from the distillation zone and cooling. This blend is thereafter used as a rubber curing agent.

The halomethyl hydrocarbon-substituted phenols coming within the purview of the present invention are those which have a hydrocarbon group in the meta or para position. The phenol portion may be either monohydric or polyhydric. The typical form of these curing agents falls under the following general formula:

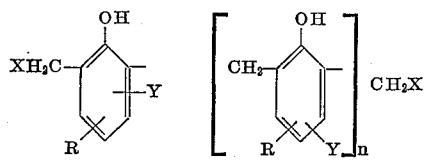

wherein $n$ is an integer from 0 to 20, R is selected from the group consisting of alkyl, aryl and alkaryl hydrocarbon containing 4 to 16 carbon atoms located in the meta or para position (3, 4 or 5 position); X is a halogen and Y is selected from the group consisting of halogen, hydrogen and a hydroxy radical. Y may be located in the meta or para position not occupied by R.

The chlorinated and brominated phenols are preferred.

Typical resins coming under the general formula are the following when $n$ is considered 0 for the purpose of establishing characteristic structures ($n$ normally being 2 to 10): 2,6-dichloromethyl-4-tertiarybutyl phenol, 2,6-dichloromethyl-4-octyl phenol, 2,6-dibromo-methyl-4-octyl phenol, 2,6-diiodomethyl-4-dodecyl phenol, 2,6-dichloromethyl-4-phenyl phenol, 2,6-dibromomethyl-5-pentadecyl phenol, 2,6-dibromomethyl-5-pentadecyl resorcinol, 2,6-dibromomethyl-4-cumyl phenol, and 2,6-dibromomethyl-3-bromo-4-tertiary butyl phenol. If desired, the halogenated resins may be blended with non-halogenated methylol-containing resin to obtain the desired reactivity.

The polymethylolhydrocarbon-substituted phenols that are halogenated according to the present invention can be prepared by reacting a substituted phenol having the two ortho positions unoccupied with a molar excess of an aldehyde. For instance, 2 moles of formaldehyde may be reacted with a mole of phenol compound in the presence of a strong alkaline catalyst, such as an alkali metal hydroxide, at a temperature between about 25 and 100° C. The monomer may be polymerized by heating at elevated temperatures, e.g., 75 to 175° C. The polymer should be oil soluble and heat reactive. Suitable methods for the preparation of para-substituted dimethylol phenol compounds are described by Honel in U.S. Patent 1,996,069. Alternately, the methylhalo hydrocarbon-substituted phenols may be made directly by condensing the phenol and aldehyde in the presence of a hydrogen halide or a hydrogen halide-forming substance.

The various aspects of the present invention will be made more clearly apparent by the reference to the following examples.

Butyl rubber "X"

A copolymer of about 98.4% isobutylene and 1.6% isoprene was prepared by reaction of the monomers at a temperature of about −100° C. in the presence of a Friedel-Crafts catalyst. The resulting rubbery copolymer had a viscosity average molecular weight of about 400,000, a Wijs iodine number of 10.9 and a Mooney viscosity of 67 (212° F. for 8 minutes).

Examples 1 and 2

To 300 grams of commercially prepared dimethylol p-octyl phenol resin, sold under the name SP–1045 resin, was added 800 cc. of benzene. The resin contains 78.29 weight percent carbon, 10.56 weight percent hydrogen, 11 weight percent oxygen, and has a methylol content of 9.2 weight percent and an average molecular weight of about 930. Two such batches were made and 150 grams of a heavy oil characterized below was added to each (hereafter denoted runs A and B) to give a 33⅓% oil concentration based on the resin.

Hydrobromination of both batches was carried out by bubbling hydrogen bromide gas into the solution for about 0.5 hours to give a final bromine concentration based on the resin-heavy oil blend of 2.8 weight percent and 2.4 weight percent, respectively, in runs A and B. The benzene solvent was thereafter removed with ease by stripping at 100 to 110° C. at a vacuum of 250 mm. of mercury. The remaining oil-resin blend was easily removed from the distillation apparatus simply by pouring the remaining liquid solution.

The characteristics of the heavy oils used in runs A and B are set forth in Table I.

TABLE I

|  | Oil A | Oil B |
|---|---|---|
| Pour point, ° F | 0 | 30. |
| Specific gravity | 0.90 | 0.886. |
| Flash point, ° F | 445 | 400. |
| Viscosity, SUS at 100–210° F | 508–58 | 111–40. |
| Aniline point | 215° F |  |
| Wijs iodine No | 16 | 24.1. |
| Principal hydrocarbon constituents. | 77% naphthenic, 23% aromatic. | 72% paraffinic, 28% aromatic. |

The oil-resin blend recovered from the distillation apparatus contained about 66 weight percent solids in both runs A and B. The blends were then each easily processed into a butyl rubber compound to give two recipes with the following formulations:

TABLE II

| | Parts by weight |
|---|---|
| Butyl rubber X | 100 |
| SRF carbon black | 25 |
| HAF carbon black | 25 |
| Stearic acid | 0.5 |
| ZnO | 5.0 |
| Oil extended resin (run A or run B) | 18.0 |

The formulations were cured 30 minutes at 307° F. to give the following physical properties:

TABLE III

|  | Run A Recipe | Run B Recipe |
|---|---|---|
| Cure at 307° F. (min.) | 30 | 30 |
| 200% modulus, p.s.i | 350 | 350 |
| 300% modulus, p.s.i | 625 | 675 |
| Tensile strength, p.s.i | 2,000 | 2,100 |
| Elongation, percent | 700 | 750 |
| Goodrich Flexometer data (100° C. oven, 0.25 in. stroke, 1800 r.p.m., 89 p.s.i., 30 min. test): |  |  |
| Percent permanent set | 13.6 | 16.8 |
| Percent dynamic drift | 5.4 | 5.5 |
| Temperature rise, ° C | 32 | 35 |
| Appearance | Excellent | Good |

The above data show that hydrohalogenation of polymethylol hydrocarbon-substituted phenol resins is effectively carried out in the presence of added heavy oil and that conventional hydrocarbon solvent is readily stripped out from the resulting blend. The data show that the resulting oil-resin blend cures butyl rubber formulations to give vulcanizates with good physical properties in a practical cure time.

*Examples 3 and 4*

A resin condensate was prepared using 1.5 moles of formaldehyde and 1 mole of p-diisobutyl phenol in the presence of 1 mole sodium hydroxide which acted as a catalyst. Following neutralization of the alkaline catalyst with dilute HCl, and water washing, 700 grams of the wet condensate (about 580 grams or solids) was contacted with 68.3 grams of 48% aqueous hydrogen bromide under agitation to effect hydrohalogenation, the halogenated resin solution having a bromine content of about 1.55 and 1.51. Two such batches of resin were prepared.

About 1350 grams of a heavy hydrocarbon oil A was added to one such batch (hereafter denoted A') and about 1350 grams of heavy oil B was added to second batch (denoted B'). The properties of the oils are those indicated in Table I. In both cases, water was thereafter stripped from the halogenated resins under reduced pressure, i.e., 25 inches of vacuum, and at a temperature of 95° C. and the blend thereafter simply discharged from the stripping zone.

The resulting blends both contained 30 weight percent resin solids. Two vulcanization recipes each containing one of the thus prepared oil-extended resins were then compounded by milling about 10 minutes about 33.3 weight parts of oil-resin blend with 100 parts of butyl rubber "X," 25 parts of SRF carbon black, 25 parts of HAF carbon black, 1.0 part of stearic acid plus 5 parts of zinc oxide.

The properties of the two recipes before and after curing are set forth in Table IV.

TABLE IV

| | Run A' | Run B' |
|---|---|---|
| Mooney Scorch at 260° F.—time to 5 point rise, minutes | 23 | 22 |
| Cure at 307° F., 30 minutes—stress-strain properties: | | |
| Modulus at 200%, p.s.i. | 380 | 340 |
| Modulus at 300%, p.s.i. | 720 | 640 |
| Tensile strength, p.s.i. | 1,930 | 1,820 |
| Elongation, percent | 675 | 665 |
| Goodrich Flexometer data (100° C. oven, 0.25 in. stroke, 1800 r.p.m., 89 p.s.i., 30 min. test): | | |
| Percent permanent set | 8.2 | 6.8 |
| Percent dynamic compression | 3.1 | 2.7 |
| Temperature rise, ° C. | 16 | 13 |
| Appearance | Excellent | Excellent |

The above data shows that the heavy hydrocarbon oil may be added after hydrohalogenation of the resin, and that it serves as an effective resin carrier during stripping of water from the halogenated resin. Rubber compounded with the resin-blends shows good resistance to scorching and vulcanizates formed from the resulting resin-oil blends exhibit good physical properties.

*Example 5*

A resin condensate was prepared by condensation of 1 mole of p-t-octyl phenol with 1.6 moles of formaldehyde using an alkaline catalyst system. The resin solution was neutralized with dilute acid (e.g., HCl) and water washed. Sufficient aqueous HCl was then added to yield a resin containing 3.5% chlorine. The resin mixture was dehydrated at 60° C. under vacuum until resin solution was clear. To the resin solution was added a sufficient amount of oil A (see Table I) to yield 30% solids in oil solution. The resin oil blend was then heated at 95° C. under vacuum to complete the removal of water and to advance the resin.

The resin was evaluated by incorporation in butyl rubber A as shown below. Butyl rubber A was an isobutylene-isoprene copolymer having a mole percent unsaturation of 1.4, a viscosity average molecular weight of 420,000 and a Mooney viscosity of 74 to 76 (8 minutes at 212° F.).

TABLE V

| | Parts by weight |
|---|---|
| Butyl rubber A | 100 |
| MPC carbon black (Kosmobile 66) | 50 |
| Zinc oxide | 5 |
| Resin solution | 33.3 |
| Cured 60 min. at 320° F.: | |
| Modulus at 200%, p.s.i. | 205 |
| Modulus at 300%, p.s.i. | 360 |
| Tensile strength, p.s.i. | 1460 |
| Elongation, percent | 700 |

The above results show that a chlorinated phenol resin is readily produced in accordance with the present invention, and upon incorporation into rubbery stock serves as an effective curing agent to give vulcanizates of good overall properties.

Although the above description has been directed to curing of butyl rubber with the resin-oil blends of the present invention, it is to be understood that such blends can be employed to cure halogenated butyl rubber or mixtures of halogenated and unhalogenated butyl-type polymers. Such halogenated butyl rubbers are formed by halogenating butyl-type polymers at −50° to 200° C. with suitable halogenating agents such as gaseous chlorine, liquid bromine, etc. The halogenated butyl rubbers, e.g., chlorinated or brominated butyl, contain at least 0.5 weight percent combined halogen but at most three atoms of combined halogen per double bond.

Having described the present invention, that which is sought to be protected is set forth in the following claims.

What is claimed is:

1. In a process of preparing halogenated polymethylol hydrocarbon-substituted phenol resins containing a $C_4$ to $C_{16}$ hydrocarbon group selected from the group consisting of alkyl, aryl and alkaryl and located in one of the meta and para positions in each of the phenolic radicals wherein the halogenation of said resins is effected in a solvent medium selected from the group consisting of an inert organic solvent and water, the improvement comprising recovering the resultant halogenated polymethylol hydrocarbon-substituted phenol resins from the reaction mixture by stripping out the solvent medium while the reaction mixture is in association with a hydrocarbon oil having a flash point above 350° F. and recovering a blend of said hydrocarbon oil and resultant polyhalomethylol hydrocarbon-substituted phenol resins.

2. The improvement of claim 1 wherein said solvent medium is a hydrocarbon boiling below 220° F.

3. The improvement of claim 1 wherein said solvent medium is water.

4. In the process of preparing halogenated polymethylol phenol substances having the generic formula:

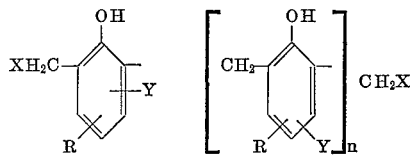

wherein $n$ is an integer from 1 to 20, R is selected from the group consisting of alkyl, aryl and alkaryl hydrocarbon containing 4 to 16 carbon atoms located in one of the meta and para positions; X is a halogen; and Y is selected from the group consisting of halogen, hydrogen and a hydroxy radical; and wherein halogenation of a polymethylol phenol substance is effected in an inert organic solvent medium which is thereafter removed by stripping, the improved method of recovering a halogenated polymethylol phenol substance suitable for vulcanizing isoolefin-multiolefin rubbery copolymers which comprises, blending a hydrocarbon oil having a flash point above 350° F. with said polymethylol phenol substance at a stage in the process of preparing said halogenated phenol substance prior to ocmpletion of solvent stripping, stripping out said solvent medium from said halogenated polymethylol phenol substance in the presence of said hydrocarbon oil, and recovering a blend of hydrocarbon oil and halogenated polymethylol phenol substance.

5. The improvement of claim 4 wherein said hydrocarbon oil is mixed with said polymethylol phenol substance during the latter's halogenation.

6. The improvement of claim 4 wherein said hydrocarbon oil is blended with said phenol substance after the latter's halogenation.

7. The improvement of claim 4 wherein said halogenated phenol substance is a brominated polymethylol phenol substance.

8. A process which comprises halogenating a polymethylol phenol resin containing a $C_4$ to $C_{16}$ hydrocarbon group selected from the group consisting of alkyl, aryl and alkaryl and located in one of the meta and para positions in each of the phenolic radicals in an inert organic solvent medium, stripping out the said inert solvent medium from the said halogenated resin while in association with a hydrocarbon oil having a flash point above 350° F. and admixing a sufficient amount of the resultant oil-resin admixture with a rubbery copolymer of a $C_4$ to $C_7$ isoolefin and a $C_4$ to $C_{14}$ multiolefin to obtain a vulcanization recipe.

9. A process as in claim 8 wherein the rubbery copolymer is an isobutylene-isoprene butyl rubber copolymer.

10. A process as in claim 9 wherein the resin employed is a brominated polymethylol p-octyl phenol resin.

References Cited by the Examiner
UNITED STATES PATENTS

| | | | |
|---|---|---|---|
| 2,375,964 | 5/1945 | Turkington et al. | 260—59 |
| 2,726,222 | 12/1955 | Palmquist et al. | 260—43 |
| 2,803,620 | 8/1957 | Mills | 260—45.75 |
| 2,809,999 | 10/1957 | Chiddix et al. | 260—621 |
| 2,821,515 | 1/1958 | Jaros | 260—33.6 |
| 2,842,533 | 7/1958 | Cahn | 260—33.6 |
| 2,899,401 | 8/1959 | Eby | 260—33.6 |
| 2,918,448 | 12/1959 | Viohl | 260—621 |
| 2,937,159 | 5/1960 | McKay et al. | 260—59 |
| 2,955,102 | 10/1960 | Clayton et al. | 260—33.6 |
| 2,972,600 | 2/1961 | Braidwood | 260—59 |

FOREIGN PATENTS 560,002  7/1958  Canada.

WILLIAM H. SHORT, *Primary Examiner.*

DANIEL ARNOLD, HAROLD N. BURSTEIN, *Examiners.*